UNITED STATES PATENT OFFICE.

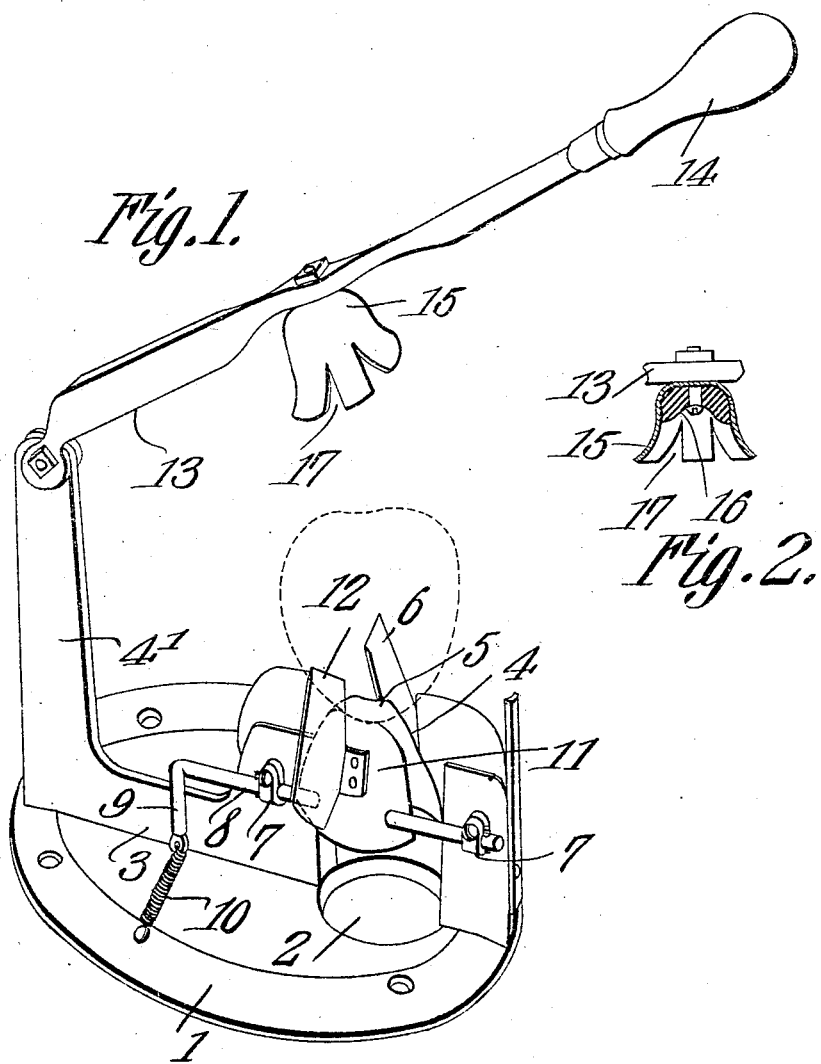

WILEY I. IRWIN, OF SULPHUR SPRINGS, TEXAS.

PEACH PITTER AND SLICER.

943,193. Specification of Letters Patent. Patented Dec. 14, 1909.

Application filed March 16, 1909. Serial No. 483,729.

*To all whom it may concern:*

Be it known that I, WILEY I. IRWIN, a citizen of the United States, residing at Sulphur Springs, in the county of Hopkins and State of Texas, have invented a new and useful Peach Pitter and Slicer, of which the following is a specification.

This invention has relation to peach pitters and slicers, and it consists in the novel construction and arrangement of its parts, as hereinafter shown and described.

The object of the invention is to provide a simple and effective implement, to be used for quickly and effectually removing the stones or pits from peaches without undue mutilation or waste of the fruit or meat.

A further object of the invention is to provide an implement of the character indicated with a fixed blade, or a series of fixed blades, which are adapted to cleave the fruit diametrically and radially, and a movable blade, which is adapted to cleave the fruit radially. By providing the combination of fixed and movable blades as indicated, the implement is especially adapted to receive fruit in which the pits differ in size. Thus the blades are so arranged as to operate upon the fruit close to the pit, thereby effecting the saving in meat as above indicated.

In the accompanying drawings:—Figure 1 is a perspective view of the pitter and slicer. Fig. 2 is a sectional view of a socket used thereon.

The peach pitter and slicer consists of a base 1, which is provided with an opening 2 and an upstanding web 3, which at one end terminates in an upstanding standard 4'. The web 3 is interrupted at diametrically opposite sides of the opening 2. A blade 4 is attached at its end portions to those portions of the web 3 occurring at opposite sides of the opening 2, and the said blade 4 bridges the space between the said portions of the web, or the space located directly above the opening 2. That portion of the blade 4 which is located over the opening 2 is outwardly bowed or convexed as at 5. The blade 4, together with its convexed portion, is what is referred to as the fixed blade, adapted to cut the fruit diametrically. Another blade 6 is fixedly mounted upon the blade 4 and extends outwardly from the convexed portion 5 and lies in a plane approximately at right angles to the end portion of the blade 4. The blade 6 is that which is referred to as the blade adapted to cut the fruit radially.

Bearings 7 are attached to the sides of the web 3, one bearing being located upon each of the portions of the said web which occurs at the sides of the opening 2. A shaft 8 is journaled in the bearings 7 and bridges the space above the opening 2. The said shaft 8 is provided with a crank end 9, and a spring 10 is attached at one end to the extremity of the said crank, and at its opposite end is secured to the base 1. The said spring 10 is under tension with a tendency to hold the extremity of the crank 9 toward its point of attachment with the base 1. A convexed blade 11 is mounted upon the shaft 8 and is in juxtaposition with relation to the convexed portion 5 of the blade 4. A blade 12 is mounted upon the outer side of the blade 11 and occupies approximately the same plane as that occupied by the blade 6 upon the blade 4. A handle lever 13 is fulcrumed at one end to the standard 4' and is provided at its opposite end with a grip 14 and at an intermediate point with a socket 15. The said socket is provided upon its inner side with a cushion 16, of rubber or other suitable material, and is provided in its edge with incisions 17. The socket 15 is so positioned upon the lever 13 that when the lever is swung toward the blades the incisions 17 of the socket 15 will receive the blades above described.

From the above description it is obvious that when a peach is placed upon the upper portions of the said blades and the lever 13 is swung so that the socket 15 is brought into contact with the top side of the peach, the said peach is forced down and its meat is split asunder by the blades 4, 6 and 12. At the same time the convexed portions 5 of the blade 4 and the blades 11 will cut the meat of the peach away from the pit thereof, and as the blade 11 is spring-retained against its work, the pit of the fruit will pass between the convexed blades and blade portions in close proximity thereto. Thus, by fixing one convexed blade and having the other convexed blade movable, differences in diameter of the pits may be compensated for without resulting in waste of the meat of the fruit.

Having described my invention, what I claim as new and desire to secure by Letters Patent, is:—

A fruit pitter comprising a fixed blade having an intermediate convexed portion with plane end portions, a plane blade mounted upon the convexed portion of the fixed blade and located approximately at right angles to the plane end portion of the fixed blade, a resiliently supported convexed blade juxtaposed with relation to the convexed portion of the fixed blade, and a blade mounted upon the said resiliently mounted convexed blade, the last said blade lying in the same plane as the blade upon the fixed convex portion of the first said blade.

In testimony that I claim the foregoing as my own, I have hereto affixed my signature in the presence of two witnesses.

WILEY I. IRWIN.

Witnesses:
   J. L. POTTS,
   D. E. MAGRILL.